J. D. JONES.
INTERNAL COMBUSTION ENGINE.
APPLICATION FILED FEB. 10, 1917.

1,231,901.

Patented July 3, 1917.
2 SHEETS—SHEET 1.

Witnesses

Inventor
John D. Jones
By
Attorney

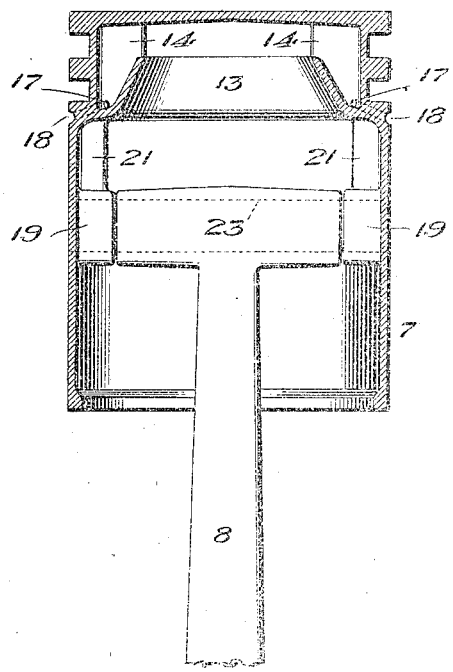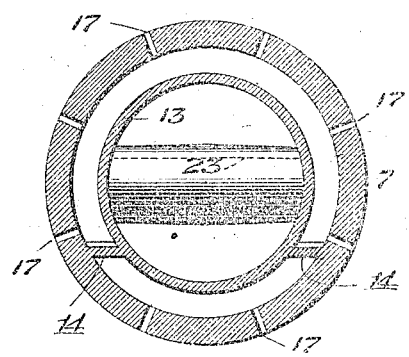

UNITED STATES PATENT OFFICE.

JOHN D. JONES, OF WALLA WALLA, WASHINGTON.

INTERNAL-COMBUSTION ENGINE.

1,231,901.   Specification of Letters Patent.   Patented July 3, 1917.

Application filed February 10, 1917. Serial No. 147,851.

*To all whom it may concern:*

Be it known that I, JOHN D. JONES, a citizen of the United States, residing at Walla Walla, in the county of Walla Walla and State of Washington, have invented certain useful Improvements in Internal-Combustion Engines, of which the following is a specification, reference being had therein to the accompanying drawing.

This invention relates to improvements in internal combustion engines, one object of the invention being the provision of a means whereby the piston, cylinder and wrist pin of a V type engine are properly lubricated and cooled, the lubricant supplied to the interior of the piston acting as a cooling agent as well as a lubricating agent.

A further object of this invention is the provision of means whereby lubricant is injected into the moving piston therewithin so that the same will be retained as a cooling agent and distributed therefrom to the periphery of the piston and consequently upon the cylinder wall and also distributed to the bearing of the wrist pin intermediate of the ends of said bearing so as to insure the thorough lubrication of these parts.

A still further object of this invention is the provision of a piston construction in which a peculiar shaped double chamber is provided at the head thereof to receive lubricant as a cooling agent, a storage space for the same being so provided that the retained lubricant will be distributed in an equal manner to lubricate the inclined walls of the cylinder and also the exterior of the piston, thus insuring an equal distribution of the lubricant at these points so that the upper side of the piston adjacent the wall of the cylinder will be properly lubricated.

In the accompanying drawings:

Fig. 3 is a vertical cross sectional view taken at right angles to that shown in Fig. 2 and slightly to the right of the wrist-pin receiving boss.

Fig. 4 is a section taken on line 4—4 of Fig. 2.

Figure 1:
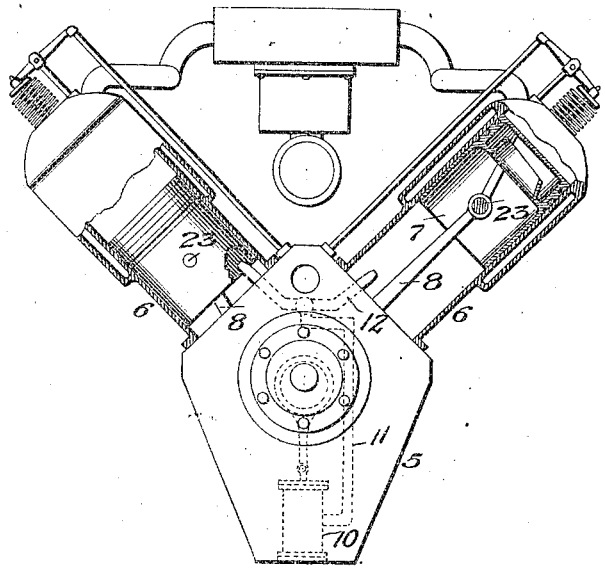
Figure 1 is an end view partly in section of a V type motor embodying the present invention.

Referring to the drawings, the numeral 5 designates the crank case which has attached thereto the cylinders 6 while mounted in each cylinder for reciprocation is the piston 7 connected by the connecting rod 8 to the crank shaft 9. Operably connected to this crank shaft is a lubricant pump 10 which has led therefrom a pipe 11 having a nozzle 12 for each cylinder. Thus it will be seen that as the crank shaft rotates the lubricant will be ejected through the nozzles and up into the hollow piston 7, thus insuring the dispensing of the lubricant at the proper time and against the underside of the head of the piston.

Figure 2:
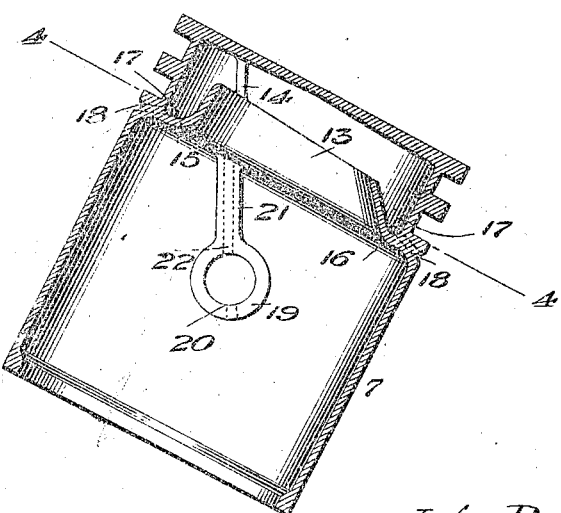
Fig. 2 is an enlarged detail sectional view through one of the pistons *per se*.

The piston is of peculiar construction and as shown in Figs. 2, 3 and 4, is provided with the integral annular flange 13 which is bridged by the two cross-webs 14 to provide the upper lubricant receiving and cooling chamber 15 and the lower lubricant receiving and cooling chamber 16. Leading from these respective chambers are the ports or ducts 17 which terminate in the circumferential groove 18 upon the periphery of the piston, thus providing a means to distribute the lubricant and cooling fluid to the outer surface of the piston and the adjacent portion of the wall of the cylinder.

By providing the webs 14 the lubricant is retained within the chamber 15 so that a sufficient amount is held to cool this hottest portion of the piston and at the same time to insure the distribution of the fluid to the upper portion of the piston and the adjacent portion of the cylinder. Formed integral within and upon opposite sides of the piston 7 are the wrist pin receiving bosses 19 each of which is provided with a bore 20 while connecting each boss 19 to the underside of the flange 13 are the webs or projections 21 each one of which is provided with a bore 22 which is in communication with the chamber 15 so that the lubricant and cooling fluid retained therein will be dispensed through the bore 22 to the wrist pin 23 intermediate of its outer end and the inner end of the respective bosses 19.

Although a fluid injecting system is here shown for insuring the direction of the same within the interior of the respective pistons 7, it is apparent that the crank shaft during rotation may feed the lubricant and cooling fluid in the usual manner but to absolutely insure the proper distribution of the lubricant and cooling fluid, the present arrangement is preferable.

It will be noted that the nozzles 12 in the present instance are located at points above the connection of the cylinder with the crank case so that the oil is sprayed directly into the piston and not splashed or sprayed from below the crank shaft as is the usual practice. In this manner the delivery of the oil to the proper place is absolutely assured without passing beyond the piston to interfere with the spark plugs.

What I claim as new is:

1. A piston for an inclined cylinder having formed within and adjacent the closed head thereof an annular flange forming a receptacle for a cooling and lubricating fluid, and partitions for dividing such receptacle into an upper and a lower chamber, such chambers each being provided with peripheral ports leading therefrom.

2. A piston for an inclined cylinder having formed within and adjacent the closed head thereof an annular flange forming a receptacle for a cooling and lubricating fluid, partitions for dividing such receptacle into an upper and a lower chamber, such chambers each being provided with peripheral ports leading therefrom, and oppositely disposed piston pin receiving bosses, the bores of which are in communication with one of said chambers.

3. A piston for an inclined cylinder having formed integral therewithin adjacent the closed end a substantially circular lip providing an annular chamber open adjacent the closed end, and partitions dividing said chamber into two receptacles each of said receptacles having ports leading therefrom to the periphery of the piston.

4. A piston for an inclined cylinder having formed integral therewithin adjacent the closed end a substantially circular lip providing an annular chamber open adjacent the closed end, partitions dividing said chamber into two receptacles, each of said receptacles having ports leading therefrom to the periphery of the piston, and oppositely disposed wrist-pin receiving bosses the bores of which intermediate of their ends are in communication with one of said chambers.

5. A piston for an inclined cylinder having formed within and adjacent the closed head thereof an annular flange, the upper edge of which is longer than the lower edge, said flange forming an annular receptacle for a cooling and lubricating fluid, and partitions for dividing said receptacle into an upper and a lower chamber, the upper chamber having a longer rim than the lower chamber, and such chambers each being provided with peripheral ports leading therefrom to the exterior of the piston.

In testimony whereof I affix my signature.

JOHN D. JONES.